United States Patent [19]
McMahon

[11] 3,769,188
[45] Oct. 30, 1973

[54] METHOD OF REMOVING OIL FROM ENGINE COOLANT
[75] Inventor: Roy C. McMahon, Kansas City, Mo.
[73] Assignee: Electrostatic Equipment Co., Kansas City, Mo.
[22] Filed: Jan. 21, 1969
[21] Appl. No.: 792,738

[52] U.S. Cl. .............................. 204/186, 204/302
[51] Int. Cl. ..................... B03c 5/00, B01d 13/02
[58] Field of Search ............... 204/186, 188–191, 204/302–308

[56] References Cited
UNITED STATES PATENTS
1,930,830  10/1933  Twombly .................. 204/272 X
744,171  11/1903  Davis et al. .................. 204/186 X
3,412,003  11/1968  Tokumoto ..................... 204/186

Primary Examiner—Thomas Tufariello
Attorney—Lowe, Kokjer, Kircher, Wharton & Bowman

[57] ABSTRACT

A process of treating cooling water to remove engine oil and to eliminate undesirable oil deposits in an internal combustion engine by subjecting the cooling water to a constant electrostatic field, by substantially insulating from ground all equipment through which the fluid passes, and then by delivering the cooling fluid to a reservoir having grounded electrodes.

2 Claims, 2 Drawing Figures

PATENTED OCT 30 1973 3,769,188

INVENTOR
Roy C. McMahon

BY Scofield, Kokjer, Scofield + Lowe
ATTORNEYS

METHOD OF REMOVING OIL FROM ENGINE COOLANT

BACKGROUND AND SUMMARY OF THE INVENTION

The present invention has its most direct application in removing engine oil from cooling water circulated continuously in a closed loop system.

When cooling water flows through an internal combustion engine, oil from packing and gasket leakage is introduced into the fluid. Unless removed, this oil deposits in the engine and inhibits effective heat transfer. To avoid the time consuming maintenance problem of cleaning the engine, various methods of treating the cooling water have been employed. A common method is to chemically treat the water. Chemical additives, however, are costly and subject to periodic replenishment.

One of the principal objects of the present invention is to provide a process of treating water to eliminate oil deposits in an internal combustion engine.

Another object of the invention is to provide a process for removing engine oil from cooling water.

A further object of the invention is to minimize maintenance time which results in lower treating water costs and allows continuous operation.

Other and further objects of the invention, together with the features of novelty appurtenant thereto, will appear in the course of the following description.

DESCRIPTION OF THE DRAWING

In the accompanying drawing, which forms a part of the specification and is to be read in conjunction therewith, and in which like reference numerals indicate like parts in the various views;

Referring to FIG. 1 as an example of a system embodying the invention, cooling water is circulated by pump 10. Pump 10 is substantially insulated from ground with nonconducting material 10a. The cooling water flows through line 11 in the direction of the arrow to inlet connection 12 of an electronic water treater 13, for which the details of construction will later be set forth. In electronic water treater 13, the cooling water is subjected to a constant electrostatic field.

Figure 1:
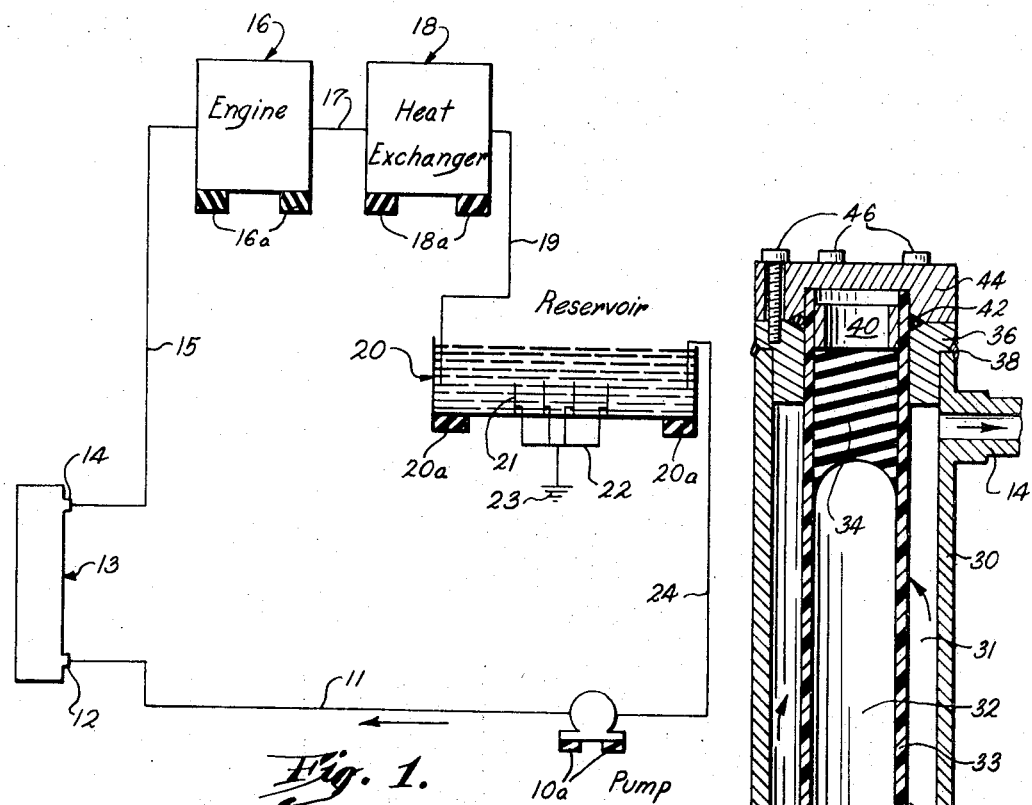
FIG. 1 is a schematic flow diagram of a system illustrating the preferred means for removing engine oil from cooling water according to the invention.

Cooling water leaves electronic water treater 13 through outlet connection 14 and flows through line 15 to internal combustion engine 16. Engine 16 is substantially insulated from ground by nonconducting material 16a. Through inevitable packing and gasket leakage in the engine, oil is introduced into the cooling water.

The fluid leaves engine 16 and flows through line 17 to heat exchanger 18. Heat exchanger 18 is substantially insulated from ground by nonconducting material 18a. The cooling fluid leaves heat exchanger 18 and flows through line 19 to reservoir 20. Reservoir 20 is substantially insulated from ground by nonconducting material 20a.

Located within reservoir 20 are plates 21 connected by electrical leads 22 to ground 23. With continuous operation, a solids precipitate collects in the bottom of the reservoir.

Completing the closed loop system, line 24 is the discharge line for reservoir 20 and the suction line for pump 10.

Figure 2:
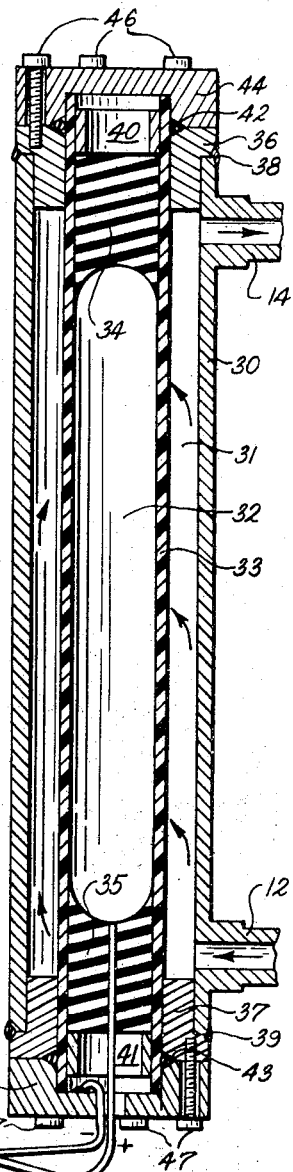
FIG. 2 is a longitudinal sectional view of an electronic water treating apparatus and a view schematically illustrating the electrical power supply circuit of this apparatus.
Figure 2:
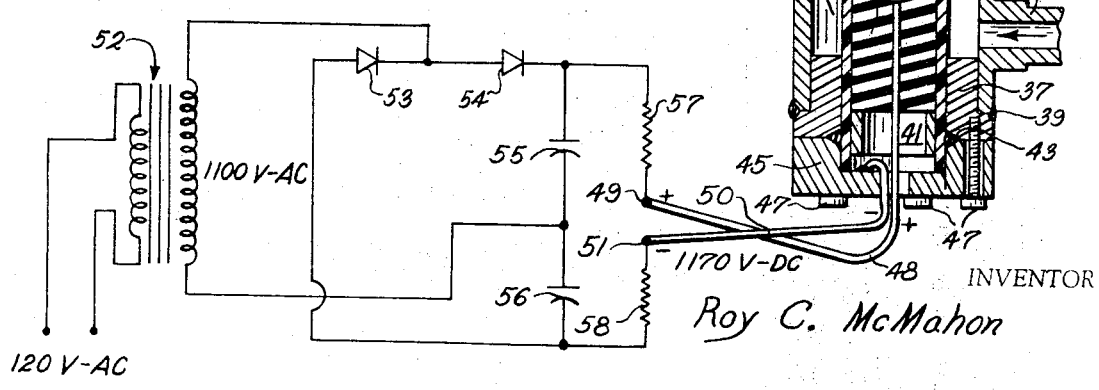

Referring to FIG. 2, the electronic water treating apparatus has a hollow cylindrical metal shell 30 with inlet and outlet cooling fluid connections 12 and 14, respectively. Disposed within shell 30 forming an annular space 31 in which fluid flows in the direction of the arrows is a hollow cylindrical electrode 32 having hollow hemispherical ends.

Electrode 32 is insulated by sleeve 33 made of dielectric material, preferably "Teflon," and at its ends by dielectric resin 34 and 35. Support members 36 and 37 position electrode 32 concentrically within shell 30 and are joined to shell 30 by welds 38 and 39. Plugs 40 and 41 fit within sleeve 33 and bear on dielectric resin 34 and 35, respectively. O-rings 42 and 43 serve as gaskets between the sleeve 33, support members 36 and 37, and end caps 44 and 45 which are bolted to support members 36 and 37 by a plurality of bolts 46 and 47, respectively.

Electrical lead 48 is connected to electrode 32 and passes through dielectric resin 35, plug 41, and end cap 45, and is connected to positive terminal 49 of the electrical power supply. Electrical lead 50 connects end cap 45 with negative terminal 51 of the electrical power supply.

Referring now to the schematic electrical diagram of FIG. 2, there is illustrated a power supply circuit. Transformer 52 takes 120 volts A.C. and delivers approximately in the range of 500 to 3,000 volts A.C. The remaining network represents a conventional rectifying circuit comprising two silicon rectifiers 53 and 54, two condensers 55 and 56, and two resistors 57 and 58. This circuit delivers within the range of approximately 500 to 3,000 volts D.C. between terminals 49 and 51.

From the foregoing description, it will be noted that the degree of electrical insulation of the components of the system plays a part in carrying out the invention. Insulation is not limited to that shown on the drawing but ideally includes insulation of all pipe supports, pipe connections, engine couplings, and other points representing a possible electrical ground in order that the best ground within the closed system will be the the grounded plates in the reservoir. In working with existing installations, it may not be possible to achieve the ideal effect. However, in such instances effective results can be achieved by increasing the voltage toward the high end of the range. As the insulation is improved, a reduction in voltage can be made. Operating in this manner eliminates undesirable deposits in the pipes, engines, and heat exchangers.

As a possible explanation of the physical mechanism whereby oil is prevented from depositing on the engine wall when the cooling water is treated as taught herein, I feel the following theory is tenable. When the cooling water passes through the electronic water treater, the electrostatic field imparts an excess of electrons to the cooling water and neutralizes or negatively charges any particles in suspension, thus causing a reduction in molecular surface tension and allowing the cooling water to carry more solids in suspension. Therefore, the oil will go into suspension rather than adhering to the engine walls. It is also felt that the excess of electrons breaks the oil down to its constituent elements and, when the charge is removed by the grounded plates in the reservoir, that elemental carbon is allowed to precipitate.

From the foregoing, it will be seen that this invention is one well adapted to attain all the ends and objects hereinabove set forth, together with other advantages which are obvious and inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it will be understood that all matter herein set forth or shown in the accompanying drawing is to be interpreted as illustrative and not in a limiting sense.

Having thus described my invention, I claim:

1. In a closed loop cooling water system for an engine, a process for the elimination of oil deposits in the engine, the steps of the process comprising:
   substantially insulating from ground all equipment in the system contacting the cooling water;
   subjecting the cooling water, prior to introduction to the engine, to a constant electrostatic field; and
   delivering the cooling water, after it leaves the engine, to an insulated reservoir having an immersed electrode therein which is adequately grounded in order that the electrode provides the best ground within the closed loop system, whereby solids precipitate from the water and collect in the reservoir.

2. The process as in claim 1, said electrostatic field applied by a direct current voltage potential in the range of 500 to 3,000 volts.

\* \* \* \* \*